April 8, 1952  H. F. SAMMONS  2,591,880
LIQUID AND VAPOR CONTROL VALVE
Filed Jan. 10, 1948  2 SHEETS—SHEET 1
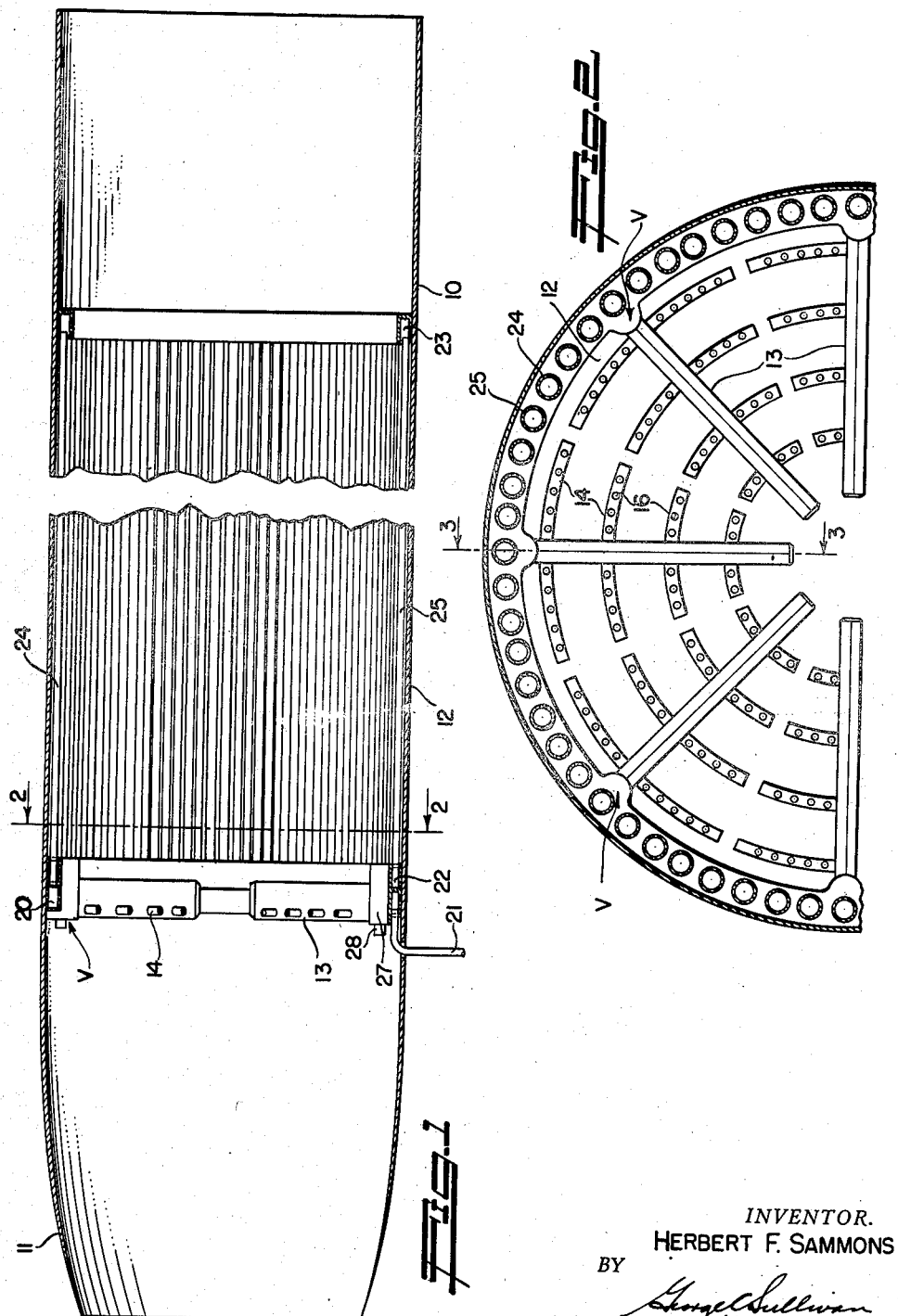
INVENTOR.
HERBERT F. SAMMONS
BY
Agent April 8, 1952 H. F. SAMMONS 2,591,880
LIQUID AND VAPOR CONTROL VALVE
Filed Jan. 10, 1948 2 SHEETS—SHEET 2
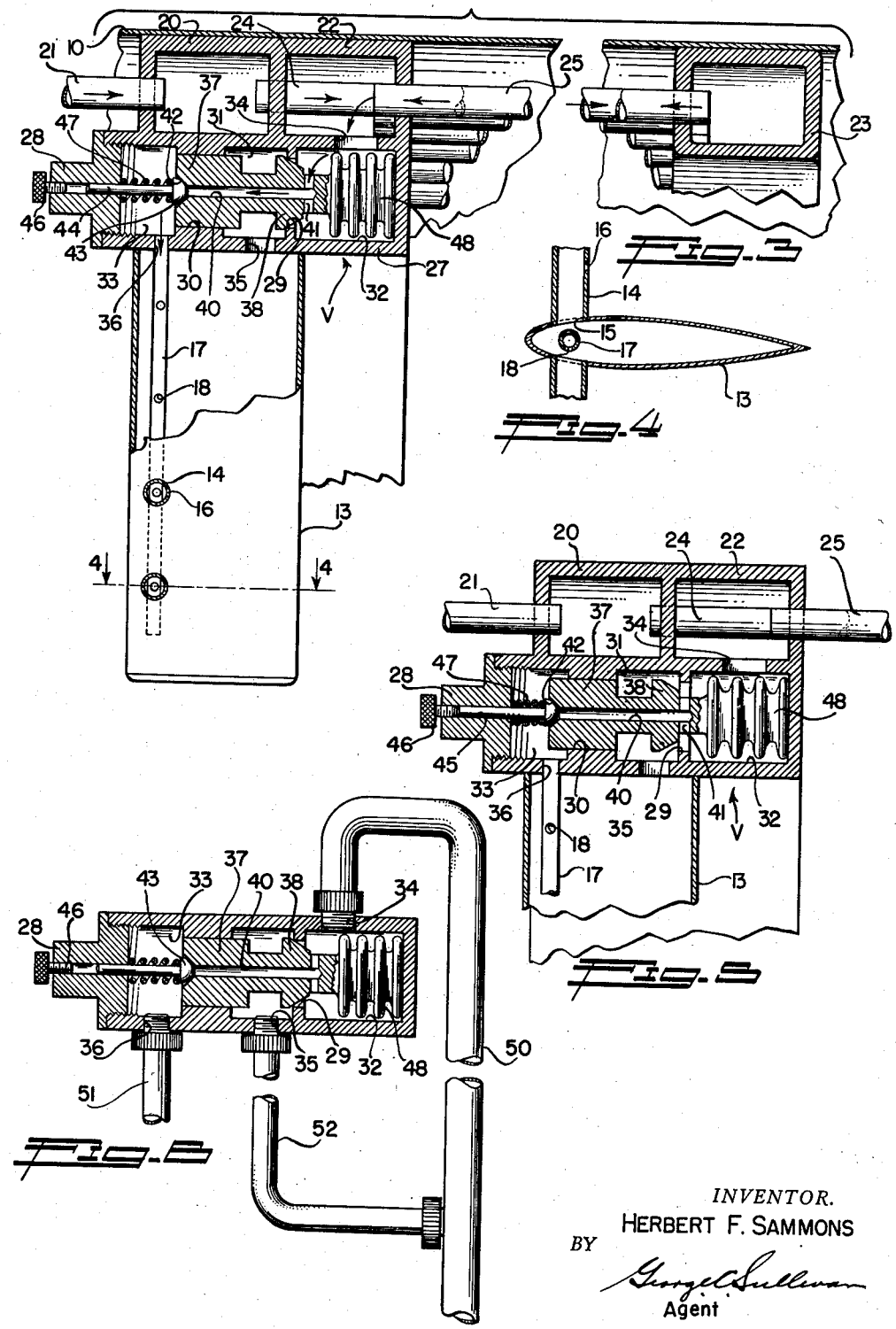
INVENTOR.
HERBERT F. SAMMONS
BY
George C. Sullivan
Agent Patented Apr. 8, 1952

2,591,880

UNITED STATES PATENT OFFICE 2,591,880

LIQUID AND VAPOR CONTROL VALVE

Herbert F. Sammons, La Crescenta, Calif., assignor to Lockheed Aircraft Corporation, Burbank, Calif.

Application January 10, 1948, Serial No. 1,606

6 Claims. (Cl. 236—92)

1

This invention relates to automatic valves and relates more particularly to valves for automatically stopping the flow or altering the direction of flow of the fluid being handled upon the formation of vapor in the line or system. It is a general object of the invention to provide a valve of this character that is simple, compact, and inexpensive and that is fully automatic.

There are numerous fluid handling systems and devices where the formation of vapor in the lines is undesirable or necessitates some change in the manner in which the fluid is directed or employed. Such may be the case, for example, in heating and refrigerating systems and in the fuel systems of boilers, turbo engines, etc. where the fuel is pre-heated prior to injection. The valves of the invention find application in such systems and in the present disclosure I will refer to a typical use of the valve for selectively directing liquid and vaporized fuel in the fuel supply or injection system of a ram jet engine and another application of the invention where the valve automatically returns the fluid to the supply system when in the vapor state and allows the through flow of the fluid when in the liquid condition. It is to be understood that these are merely typical of the several uses or embodiments of the invention and are not to be construed as restricting either the scope or usefulness of the invention.

It is another object of the invention to provide a valve of the character referred to that may be employed to direct a liquid in a selected or given manner until temperature and/or pressure conditions convert the fluid into a vapor whereupon the vapor is directed to flow in a different path and is prevented from following the course of the liquid. The valve may be connected between a fluid supply line and a pair of downstream lines, one of the latter being intended to receive liquid, and the other being intended to receive vapor, and the valve directs the fluid into the liquid line so long as it is in the liquid state automatically closes the liquid line and opens the vapor line for the reception of the fluid when it is changed into a vapor. The valve also automatically re-opens the liquid line and re-closes the vapor line when the fluid again returns to a liquid condition.

Another object of the invention is to provide a valve of this kind wherein the operating characteristics may be readily changed to adapt it for the handling of various fluids. The device embodies a sealed or closed bellows for control-

2 ling the valve closures and containing a fluid that responds to the temperature of the fluid being handled. By providing the bellows with fluids of different boiling points the valve may be made to operate at different temperatures.

Another object of the invention is to provide a valve for the fuel injection system of a turbo engine, ram jet engine, or the like, that prevents the discharge of the liquid fuel from the fuel injectors until a sufficient pressure has been built up to assure atomization, then automatically directs the liquid fuel to liquid injecting orifices to initiate operation of the engine and then automatically terminates flow to the liquid orifices when the fuel is vaporized by pre-heating, directing the pre-heated vaporized fuel to vapor orifices for efficient combustion. The valve is well adapted for use in the fuel injection system of an engine having a fuel pre-heating or vaporizing means and serves to prevent premature introduction of the fuel at low pressures and to prevent the injection of liquid fuel from the large vapor injecting orifices, thus eliminating the introduction of unatomized fuel into the combustion chamber.

A further object of the invention is to provide a valve of the character referred to in which the actuating bellows first responds to the temperature of the fluid to open the vapor port and then by reason of an increased differential between the internal bellows pressure and the pressure surrounding the bellows, opens the vapor port to a greater extent and closes the liquid outflow port thereby assuring the free discharge of vapor into the proper channels. As distinguished from a thermostatic device the valve of the invention responds to or is actuated by both temperature and pressure to obtain a sequential and progressive action of the valve closures.

Other objectives and features of the invention will become apparent from the following detailed description of typical preferred embodiments throughout which description reference is made to the accompanying drawings in which:

Figure 1 is a longitudinal sectional view of a ram jet engine embodying the valves of the invention;

Figure 2 is an enlarged fragmentary transverse sectional view taken as indicated by line 2—2 on Figure 1;

Figure 3 is a fragmentary, longitudinal, sectional view of the engine on an enlarged scale taken substantially as indicated by line 3—3 on Figure 2 showing the direction of fuel flow when the liquid valve closure is in the open position;

Figure 4 is a transverse, sectional view of the fuel injecting means taken substantially as indicated by line 4—4 on Figure 3;

Figure 5 is a fragmentary, sectional view of one of the valves showing the vapor valve closure in the open position; and Figure 6 is a longitudinal sectional view of another form of valve of the invention.

In Figures 1 to 5 inclusive of the drawings I have shown the invention embodied in a ram jet engine of the general type employed for the propulsion of aircraft, guided missiles, etc. The engine includes an elongated tubular shell or body 10 provided at its forward end with a rearwardly divergent inlet and diffuser 11 for the reception of the rammed air during flight. The intermediate portion of the body 10 constitutes the combustion chamber 12 of the engine and the rear end of the body is open or provided with a nozzle for the discharge of the combustion gases and air in the form of a propulsive reaction jet. The burner of the engine includes a series of circumferentially spaced radially disposed members 13. The members 13 extend radially inward at the entrance to the combustion chamber 12 and, as shown in Figure 4, are streamlined in transverse cross section and are hollow or tubular. As will later become apparent, the members 13 receive the vaporized fuel from the valve V of the invention. Arcuately curved arms 14 project from the opposite sides of the members 13 and ports 15 in the walls of the members place the interiors of the tubes in communication with the interiors of the radial members, see Figure 4. The arms 14 are spaced apart radially and are arranged to form substantially circular series, as best shown in Figure 2. A plurality of spaced orifices 16 is provided in each arm 14 for the injection of the fuel into the combustion chamber.

The fuel injecting means or burner further includes tubes 17 arranged axially in the forward portions of the hollow members 13. The tubes 17 are intended to discharge liquid fuel into the tubular arms 14 prior to vaporization of fuel. Longitudinally spaced orifices 18 are provided in opposite sides of the tubes 17 and are aligned with the ports 15. The liquid orifices 18 are considerably smaller in diameter than the ports 15 and tubes 14 and are adapted to discharge streams of liquid fuel under pressure into the tubes for ultimate discharge from the orifices 16. The above described members 13 and tube 17 may be carried by the valves V, as will be later described.

The engine includes a pre-heater or vaporizer for vaporizing the fuel prior to its introduction into the combustion chamber 12. The vaporizer includes an annular manifold 20 arranged in the body 10 ahead of the combustion chamber. A fuel supply pipe 21 discharges into the manifold 20. The pipe 21 conducts liquid fuel from a source, not shown, and in practice the fuel is delivered to the manifold 20 under pressure. A second annular manifold 22 is arranged at the rear side of the manifold 20 and a third annular manifold 23 is provided in the body 10 at the rear end of the combustion chamber 12. A set of circumferentially spaced vaporizing tubes 24 extends between the manifold 20 and the rear manifold 23. The tubes 24 are spaced from the wall of the body 10 and pass through the walls of the manifold 22. The forward ends of the tubes 24 are open to the supply manifold to receive fuel therefrom and the rear ends of the tubes are open to the manifold 23. A second set of tubes 25 extends between the manifolds 22 and 23. The tubes 25 are spaced between the tubes 24 and have their rear ends open to the manifold 23 to receive fuel therefrom while their forward ends are open to the manifold 22 to discharge fuel therein. It will be seen that fuel supplied by the pipe 21 is distributed to the tubes 24 to flow rearwardly therethrough to the manifold 23. The fuel then returns forwardly through the tubes 25 to the manifold 22. During operation of the engine the fuel flowing through the tubes 24 and 25, which, in effect, line the walls of the combustion chamber, is pre-heated and vaporized by the heat generated in the combustion chamber.

The valves V serve to govern or control the delivery of fuel from the manifold 22 to the burner members 13 and tubes 17. There is a valve V at the outer end of each member 13 and as the several valves V may be identical, I will proceed with a description of one valve, it being understood that this description is equally applicable to the other valves.

Each valve V includes a body 27 having an axial bore or opening closed at one end by an integral wall of the body and closed at the other end by a suitable threaded plug 28. The body 27 has two axially spaced internal partitions or flanges, one presenting a valve seat 29 and the other defining an axial bore or opening 30. The two spaced internal flanges also divide the interior of the body 27 into an intermediate chamber 31 and two end chambers 32 and 33. A port 34 maintains the chamber 32 in communication with the fuel manifold 22 while a port 35 in the wall of the valve body 27 connects the intermediate chamber 31 with the interior of the associated hollow burner member 13. A third port, or opening, 36 in the body 27 receives the outer end of the related burner tube 17 so that the tube communicates with the chamber 33. This construction is clearly illustrated in Figures 3 and 5. In this connection it will be observed that the outer end of the related burner member 13 and tube 17 may be secured to the related valve body 27.

The valve V further includes the movable element 37 slidably guided in the opening 30 and extending into the chamber 31 to have a valve closure 38 for cooperating with the seat 29. A central axial opening or passage 40 is formed in the movable element 37 and has one end which is adapted to communicate with the chamber 33. Lateral openings 41 in the element 37 connect the other end of the passage 40 with the chamber 32. The passage 40 is adapted to conduct liquid fuel from the chamber 32 to the chamber 33 and injection tube 17. A valve seat 42 is formed on the end of the movable element 37 around the end of the passage 40 and a valve closure or head 43 is carried by a stem 44 which is slidably guided in an opening 45 in the plug 28. A screw 46 is threaded in the outer end of the opening 45 to form an adjustable stop for limiting outward movement of the stem 44 and its valve head 43 for the purpose to be subsequently described. The valve head 43 is spring-loaded, that is it is yieldingly urged into cooperation with the seat 42. In the simple construction illustrated a helical spring 47 is arranged under compression between the head 43 and the inner end of the plug 28 to urge the head 43 against its seat 42.

From the foregoing it will be seen that the valve head or closure 38 of the element 37 serves to cooperate with the seat 29 to control the passage of fuel from the chamber 32 into the port 35 and burner member 13 while the valve head 43 cooperating with the seat 42 on the element 37 controls the passage of fuel from the chamber 32 into the chamber 33 and burner tube 17. The port 35 and the port defined by the seat 29 are intended to handle the vaporized fuel and are considerably greater in fluid capacity than the passage 40 and tube 17 which handle the liquid fuel. The chamber 32 constitutes a receiving space which receives both the liquid and vaporized fuel from the manifold 22, the liquid being caused to flow out through the passage 40 and the vaporized fuel being allowed to flow through the seat 29 and port 35 under the control of the temperature and pressure responsive means described below.

The valve V is characterized by a temperature and pressure responsive member in the form of a closed or sealed bellows 48 for moving or operating the valve element 37. The bellows 48 is housed in the chamber 32 and is arranged to be in axial alignment with the movable valve element 37. One end of the bellows 48 is fixed or secured to the wall of the body 27 and the other end of the bellows is attached to the element 37. In view of the fact that the body wall is fixed and stationary, contraction and expansion of the bellows 48 results in axial movement of the element 37. The bellows 48 is spaced from the walls of the chamber 32 to be surrounded by or "immersed" in the fluid contained in the chamber. The bellows 48 contains or is charged with a selected fluid. For example, the bellows 48 may contain a fuel of the same character as being supplied to the combustion chamber 12. The operating characteristics of the valve V may be readily adjusted to suit given applications by charging the bellows 48 with fluid having given or selected boiling points. The parts are constructed and related so that the closure 38 is held firmly against its seat 29 by the resiliency of the bellows 48 and the valve head 43 is held against its seat 42 by the spring 47 when the bellows 48 is in the contracted position and there is no fluid pressure in the chamber 32.

In starting the ram jet engine, liquid fuel under pressure is delivered to the pipe 21 to flow through the vaporizing tubes 24 and 25 to the manifold 22 and chamber 32. The spring 47 is designed to hold the valve head 43 closed to prevent the fuel from flowing into the tube 17 until a sufficient pressure has built up to assure atomization of the liquid fuel when it is discharged at the burner. When such a pressure has built up, the pressure unseats the valve head 43 and the liquid fuel flows through the passage 40, chamber 33 and tube 17 to discharge into the combustion chamber 12 from the burner. The fuel thus injected is ignited by the usual igniter or other means (not shown) and is consumed in the air under pressure flowing through the combustion chamber 12.

Until this time it may be assumed that the fuel delivered to the valve V is cold or unheated. However, as the combustion of the atomized fuel continues, the fuel flowing through the vaporizing tubes 24 and 25 becomes heated and finally is vaporized in whole or in part by the time it reaches the chamber 32. This heated fuel surrounding the bellows 48, transfers a portion of its heat to the fluid in the bellows and this confined body of fluid vaporizes. Since the bellows 48 is a closed cell or chamber, vaporization of the fluid within it exerts a considerable axial pressure on the wall of the bellows. This pressure, exerted by the vaporized fluid in the bellows 48, moves the element 37 to shift the closure 38 away from its seat 29. Upon opening of the closure 38, the fuel vapor is free to flow through the port or seat 29, the chamber 31 and port 35 into the burner member 13 to ultimately discharge from the orifices 16. The discharge of the fuel vapor from the chamber 32 through the port or seat 29 reduces the pressure surrounding the bellows 48. The reduction in pressure around the bellows 48 increases the differential between the pressure within the bellows and the pressure in the chamber 32, and the bellows 48 expands further. This additional expansion of the bellows 48 opens the valve closure 38 to a greater extent and the additional axial movement of the element 37 closes the liquid valve, that is it brings the seat 42 into engagement with the valve head 43. Figure 5 shows the position of the various valve parts at this time. It will be observed that the stem 44 engages the screw 46 to limit movement of the valve head 43 and element 37. The screw 46 may be adjusted to predetermine the final fully opened position of the valve closure 38.

So long as the fuel is consumed in the combustion chamber 12 and so long as the pre-heated vaporized fuel is supplied to the chamber 32, the valve V remains in the position shown in Figure 5 and the fuel vapor is delivered to the burner. However, when engine operation is terminated and pre-heated fuel is no longer delivered to the chamber 32, the bellows 48 contracts and the parts are returned to the positions illustrated in Figure 3. From the foregoing it will be seen that operation of the valve V is entirely automatic.

Each of the several valves V operates as above describe to supply the liquid and vaporized fuel to their respective burner tubes 17 and members 13. When the fuel pressure is diminished or terminated at the end of engine operation the valve heads 43 of the several valves V engage against their seats 42 under the action of the springs 47 to prevent an undesirable leakage or discharge of liquid fuel into the burner when the engine is idle.

In Figure 6 I have illustrated a valve V of the invention installed in a fluid handling system to return vapor to the upstream side of the system. The valve in this case may be substantially identical with the valve V described above and corresponding reference numerals are applied to the corresponding parts of the several valves illustrated. In Figure 6, a fluid supply line 50 delivers fluid to the port 34 to flow into the chamber 32. An outflow or downstream pipe 51 communicates with the chamber 33 at the port 36 to carry away the fluid. It will be assumed that the fluid being handled is normally in a liquid state and that it is undesirable to have vapor flow into the pipe 51. A vapor return pipe 52 extends from the port 35 to the upstream or supply side of the fluid handling system.

The operation of the valve V of Figure 6 is substantially the same as in the foregoing embodiment or application of the invention. So long as fluid is supplied to the valve at a sufficient pressure to unseat the valve head 43 the fluid flows through the chamber 32, passage 40 and chamber 33. In the event the fluid becomes sufficiently hot to vaporize or partially vaporize the bellows 48 expands as above described to open the closure 38 and allow the vapor to return through the line 52. Upon opening of the closure 38 the pressure in the chamber 32 is reduced and the bellows 48 expands further to close the passage 40 and open the closure 38 an additional amount, all as previously described. Accordingly, flow of vapor to the downstream line 51 is effectively prevented. When the overheating or vaporizing of the fluid is remedied and the temperature of the fluid in the chamber 32 is reduced, the bellows 48 contracts and the parts returns to the position illustrated in the drawings so that the liquid fluid flows through the valve to the line 51.

Having described only typical preferred embodiments of my invention I do not wish to be limited or restricted to the specific details set forth, but wish to reserve to myself any features or modifications that may fall within the scope of the following claims.

I claim as my invention:

1. A valve of the character described comprising a body structure having a fluid receiving chamber, a liquid outlet, and a vapor outlet, a valve element movable to control the vapor outlet and having a liquid passage leading from said chamber to the liquid outlet, a valve closure for cooperating with said element to control said passage and movable away from said element under liquid pressure to open said passage, spring means for holding the closure in cooperation with said element and yieldable to allow the closure to move away from said element, and means in said chamber responsive to the temperature and pressure of the fluid therein to move said element and thereby selectively control the discharge of liquid and vapor through said liquid and vapor outlets.

2. A valve of the character described comprising a body structure having a fluid receiving chamber, a liquid outlet, and a vapor outlet, a valve element movable to control the vapor outlet and having a liquid passage leading from said chamber to the liquid outlet, a spring loaded valve closure movable relative to said element and spring urged thereagainst to initially close said passage, said closure being movable in one direction relative to said element by liquid pressure to open and allow the discharge of liquid when the element is in the closed position and the liquid pressure in the chamber and passage reaches a given value, and means in said chamber sensitive to the temperature and pressure therein for moving said element in said one direction to an open position when the fluid in said chamber is in the vapor state to allow the flow of vapor to the vapor outlet and to effect closing of said passage by said valve closure.

3. A valve of the character described comprising a body structure having a fluid receiving chamber, a liquid outlet, and a vapor outlet, a valve element movable to control the vapor outlet and having a liquid passage leading from said chamber to the liquid outlet, a spring loaded valve closure movable relative to said element and engageable therewith to initially close said passage, said closure being adapted to open to allow the discharge of liquid when the element is in the closed position and the liquid pressure in the chamber and passage reaches a given value, and means in said chamber sensitive to the temperature and pressure therein for moving said element to an open position when the fluid in said chamber is in the vapor state to allow the flow of vapor to the vapor outlet and to effect closing of said passage by said valve closure, said means including a sealed fluid containing bellows connected with said element to move the same upon expansion and contraction of the bellows.

4. A valve of the class described comprising a body structure having a fluid receiving chamber, a liquid outlet, and a vapor outlet, a valve element movable to control the vapor outlet and having a liquid passage leading from said chamber to the liquid outlet, a valve closure movable relative to said element and engageable with one end of said element to close said passage, a spring for initially holding said closure in the closed position against said element and adapted to yield to allow opening of said closure when the pressure in said chamber reaches a given value, and a sealed fluid containing bellows in said chamber connected with the other end of said element to hold the element in a position where the vapor outlet is closed until the fluid in the chamber reaches a vapor state whereupon the bellows expands to move said element to open the vapor outlet so that vapor may flow from the chamber, the reduction in pressure in the chamber accompanying the vapor discharge therefrom, causing further expansion of the bellows to further open the vapor outlet and to move said element against the valve closure to close off said liquid passage.

5. A valve of the class described comprising a body structure having a fluid receiving chamber, a liquid outlet, and a vapor outlet, a valve element movable to control the vapor outlet and having a liquid passage leading from said chamber to the liquid outlet, a valve closure movable relative to said element and engageable with one end of said element to close said passage, a spring for initially holding said closure in the closed position against said element and adapted to yield to allow opening of said closure when the pressure in said chamber reaches a given value, and a sealed fluid containing bellows in said chamber connected with the other end of said element to hold the element in a position where the vapor outlet is closed until the fluid in the chamber reaches a vapor state whereupon the bellows expands to move said element to open the vapor outlet so that vapor may flow from the chamber, the reduction in pressure in the chamber accompanying the vapor discharge therefrom causing further expansion of the bellows to further open the vapor outlet and to move said element against the valve closure to close off said liquid passage, and an adjustable stop for limiting opening movement of said valve closure so that said further expansion of the bellows brings said element against said closure to positively close said passage.

6. A valve comprising a body having a fluid receiving chamber, a first outlet and a second outlet, a valve element in the body initially closing said second outlet and movable in one direction to allow the flow of fluid from said chamber into said second outlet, the element having a passage leading from said chamber to said first outlet, a movable valve closure engageable with one end of the element to close said passage, a spring for urging the closure in the opposite direction to said direction of movement of the element to initially hold the closure in the closed position against said end of the element, the spring being adapted to yield in response to pressure of a given value in said chamber and passage to allow opening of the closure, means for limiting opening movement of the closure, and a sealed fluid-containing bellows connected with the other end of the element initially holding the element in the position where the second outlet is closed, expansible by increased temperature in said chamber to move the element in the other direction to open the second outlet and thus relieve the pressure in said chamber and expansible further in response to the resultant decreased pressure in the chamber to further move the element in said other direction to bring the first mentioned end of the element against said closure to close said passage.

HERBERT F. SAMMONS.

REFERENCES CITED

The following references are of record in the file of this patent:

UNITED STATES PATENTS

| Number | Name | Date |
| --- | --- | --- |
| 1,354,740 | Giesler | Oct. 5, 1920 |
| 1,791,756 | Fay | Feb. 10, 1931 |
| 2,020,075 | Meagher | Nov. 5, 1935 |
| 2,031,558 | Clifford | Feb. 18, 1936 |
| 2,065,148 | Nallinger | Dec. 22, 1936 |
| 2,202,705 | Martin-Hurst et al. | May 28, 1940 |
| 2,377,132 | Crowe | May 29, 1945 |
| 2,400,615 | Warrick et al. | May 21, 1946 |
| 2,404,428 | Bradbury | July 23, 1946 |

FOREIGN PATENTS

| Number | Country | Date |
| --- | --- | --- |
| 476,446 | Germany | May 17, 1929 |